United States Patent

Neuf

[15] 3,652,941

[45] Mar. 28, 1972

[54] DOUBLE BALANCED MICROWAVE MIXER USING BALANCED MICROSTRIP BALUNS

[72] Inventor: Donald Neuf, Wantagh, N.Y.

[73] Assignee: RHG Electronics Laboratory, Inc., Farmingdale, L. I., N.Y.

[22] Filed: Feb. 24, 1970

[21] Appl. No.: 13,436

[52] U.S. Cl. ................................325/446, 329/160, 333/25, 333/34, 333/84 M

[51] Int. Cl. ..........................................................H04b 1/06

[58] Field of Search..................325/430, 435, 436, 439, 442, 325/445, 446, 448, 449, 450, 451; 329/160–163, 164, 166; 332/43, 47; 333/34, 25, 84 M; 330/116, 117

[56] References Cited

UNITED STATES PATENTS

| | | | |
|---|---|---|---|
| 3,492,603 | 1/1970 | Fredrick | 325/445 |
| 3,419,813 | 12/1968 | Kamnitsis | 333/34 |
| 3,245,010 | 4/1966 | Oliver | 333/34 |
| 3,310,748 | 3/1967 | Putnam | 325/446 |
| 3,435,349 | 3/1969 | Pascoe et al. | 325/449 |

*Primary Examiner*—Robert L. Griffin
*Assistant Examiner*—Albert J. Mayer
*Attorney*—Leonard H. King

[57] ABSTRACT

A microwave mixer using a double balanced diode bridge arrangement, provided with a signal input, a local oscillator input and an output. Microstrip baluns, having their ground plane metallic strip tapered, are connected between the inputs and the bridge. The diode bridge is assembled in a package wherein all the connections are of substantially identical lengths, and is placed in a substrate which is suspended in air within a housing.

19 Claims, 19 Drawing Figures

INVENTOR.
DONALD NEUF

BY Leonard H. King

ATTORNEY

INVENTOR.
DONALD NEUF
BY

ATTORNEY

INVENTOR.
DONALD NEUF
BY
Leonard H. King
ATTORNEY

INVENTOR.
DONALD NEUF
BY
Leonard H. King
ATTORNEY

INVENTOR.
DONALD NEUF
BY Leonard H. King
ATTORNEY

INVENTOR.
DONALD NEUF

BY
Leonard H. King
ATTORNEY

DOUBLE BALANCED MICROWAVE MIXER USING BALANCED MICROSTRIP BALUNS

This invention relates to microwave mixers and more particularly to a microstrip double balanced microwave mixer.

BACKGROUND OF THE INVENTION

There has recently been increased interest in the fabrication of microwave components and systems from microstrip transmission line. Microstrip, as is well known in the art, consists of a dielectric material, usually alumina, which has one side covered with a metallic film that acts as a ground plane while the opposite side has the appropriate width metallic strip for the desired characteristic impedance. This clad dielectric is usually placed in a shielded enclosure to insure an interference free microwave circuit. Using this type of construction with photo etching techniques to define the desired conductor pattern, it is usually possible to reduce the size and cost of many microwave components below that of their waveguide or rigid coaxial equivalent.

In order to insure that no radiation or higher order modes can exist on a microstrip transmission line at a given frequency with a given dielectric constant, there are inherent restrictions on the maximum thickness of the dielectric and the width of the conductor. As a result of the limited conductor area, the loss of microstrip is usually higher than the same impedance coaxial line in air. Furthermore, the maximum obtainable isolation from a miniature microstrip 180 degree coupler (rat race) or 90 degree branch line coupler (FIGS. 1*a*, 1*b*) is significantly less than the strip line equivalent because of this higher line loss. The use of a coupler with poor isolation will, of course, result in a mixer with a poor signal to local oscillator isolation.

Aside from the "rat race" or branch line coupler, many mixers use 90° couplers (FIG. 1C) made from two parallel transmission lines which are backward coupled. These type mixers, while capable of larger operating bandwidths than the rat race or branch line types, have poor inherent isolation owing to the fact that reflected local oscillator frequency from the crystals will be directly coupled to the RF input frequency port, regardless of the coupler isolation.

One of the best suited mixer types for signal isolation is the double balanced mixer. This mixer is well suited to balanced microstrip construction because small losses in the lines will not degrade the RF to LO isolation, or balance of power in the diodes. Balanced microstrip, unlike conventional microstrip, has identical conductor widths on each side of the dielectric center. Furthermore, the double balanced mixer is capable of providing lower conversion loss and intermodulation products than the single diode mixer or the balanced diode mixer. These are important considerations for wide-band applications requiring high sensitivity.

In the microstrip construction of a double balanced mixer, the main problem is bandwidth limitations due to the input RF and LO baluns. In accordance with this invention, an almost frequency independent microstrip transmission line is used as a balun, wherein part of the conventional ground metallic conductor of the microstrip is tapered in accordance with a given impedance variation and left ungrounded. It is also possible to obtain mixer action without a taper, but the bandwidth is significantly less. In order to contain all the RF field energy between the conductors of the balanced and unbalanced lines, the dielectric constant of the medium between the conductors must be much higher than that leading to the surrounding metal enclosure. This condition is satisfied by suspending the alumina substrate of the microstrip within the metal enclosure.

Accordingly, it is a main object of this invention to provide a microstrip construction of a double balanced mixer.

A further object is to provide a microstrip mixer which retains the advantages of small size and low cost while avoiding the disadvantages of limited bandwidth and poor signal isolation.

Another object is to avoid the conventional unbalanced microstrip circuits in the construction of a microwave mixer, in favor of a wide band balanced microstrip configuration.

A still further object is to provide a microstrip balance which is almost frequency independent.

Yet another object is to provide a microstrip balun having its ground side tapered between an unbalanced and a balanced line.

A further object is to provide a balanced microstrip mixer wherein all the RF field energy is contained between the conductors of the balanced and unbalanced lines.

Yet another object is to provide a diode package of a double balanced mixer which has equal lead lines for inductance equalization and minimum stray capacitance.

A still further object is to provide a double balanced mixer which can be used as a voltage co ntrolled attenuator.

Yet a further object is to provide a microstrip embodiment of a double balanced mixer which has wide bandwidth, good signal isolation, and small size.

Further objects and improvements will become apparent from the following detailed description taken in conjunction with the attached drawings in which:

FIGS. 1*a*, 1*b*, 1*c* represent three types of mixers as is heretofore known in art;

FIG. 2 describes the even and odd modes of microstrip coupling as is heretofore known in the art;

Figures 4, 5:
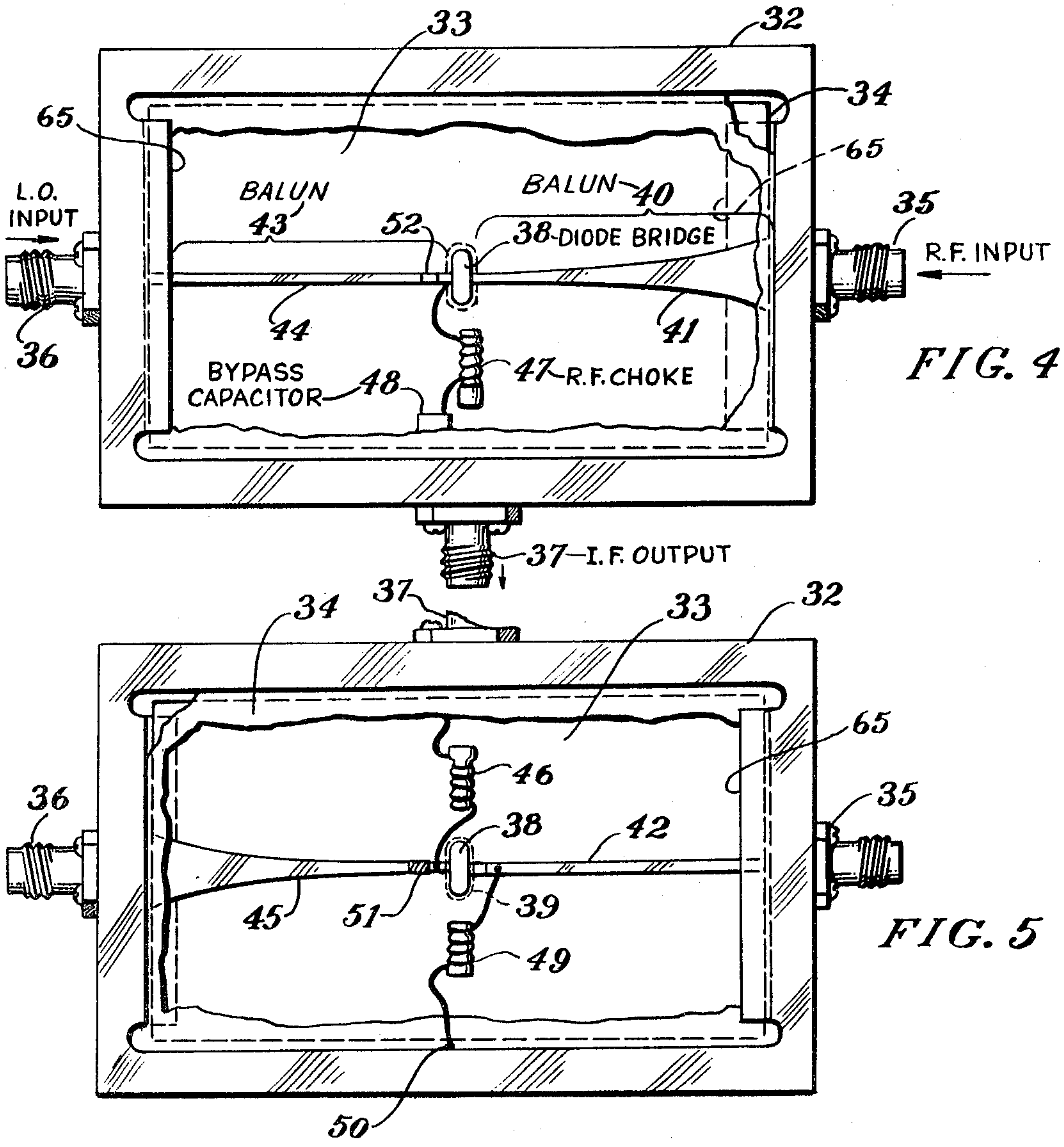
FIG. 4 shows a microstrip construction of a double balanced mixer in accordance with this invention.
Figure 4A:
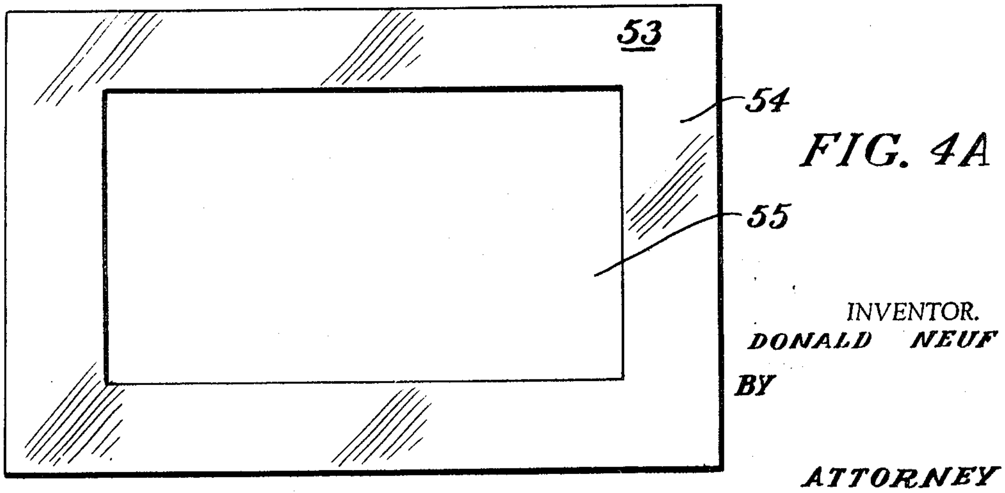
Figure 6:
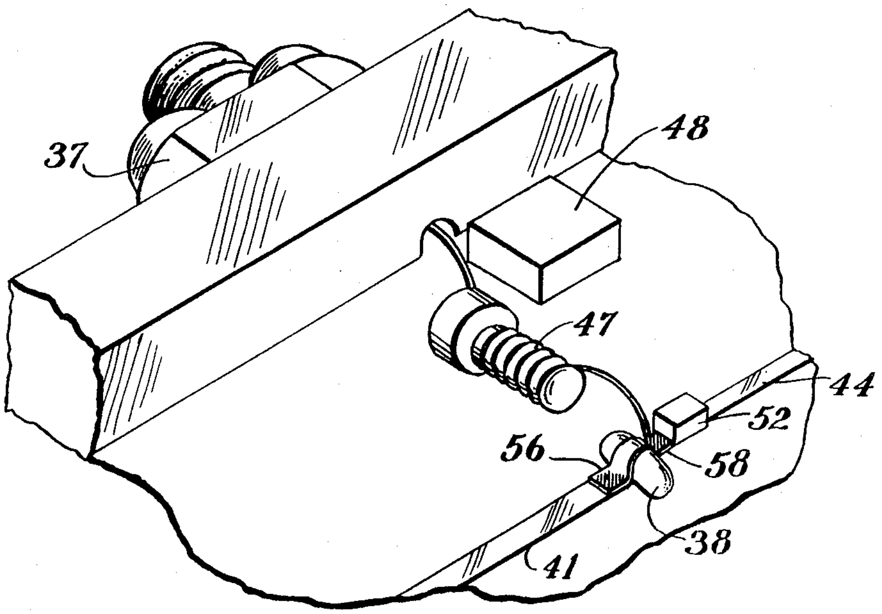
Figure 7:
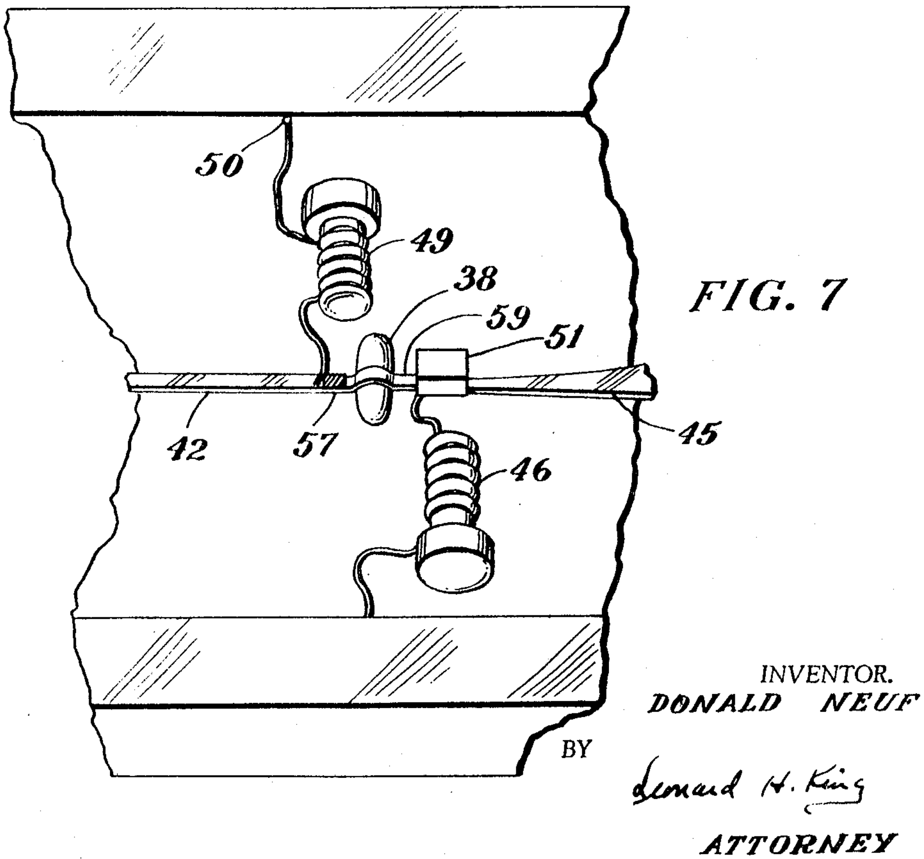
Figure 8:
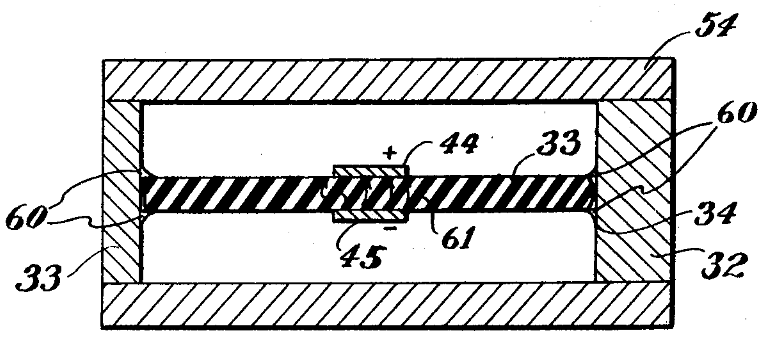
Figure 9:
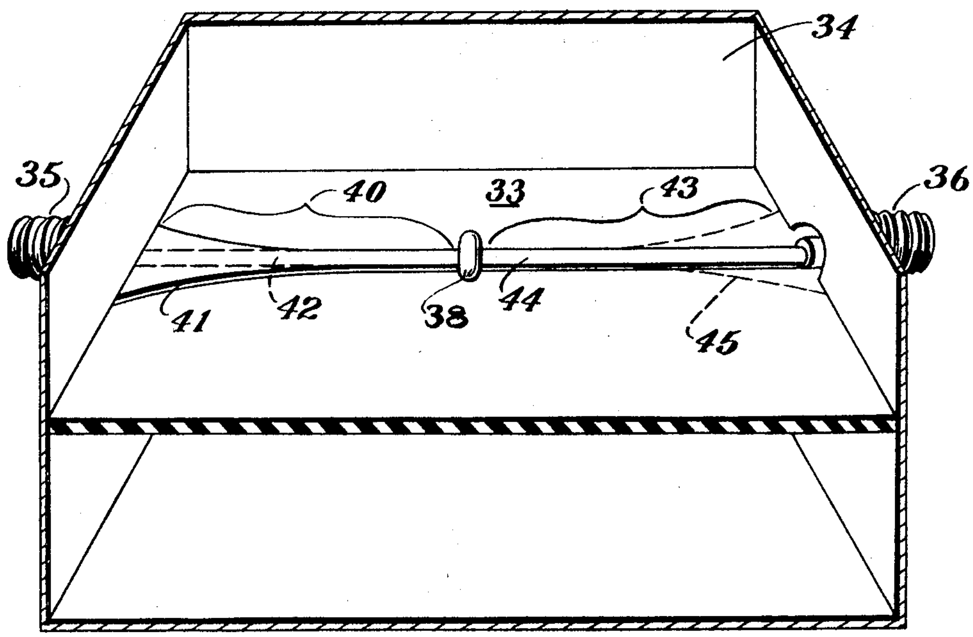
Figure 10:
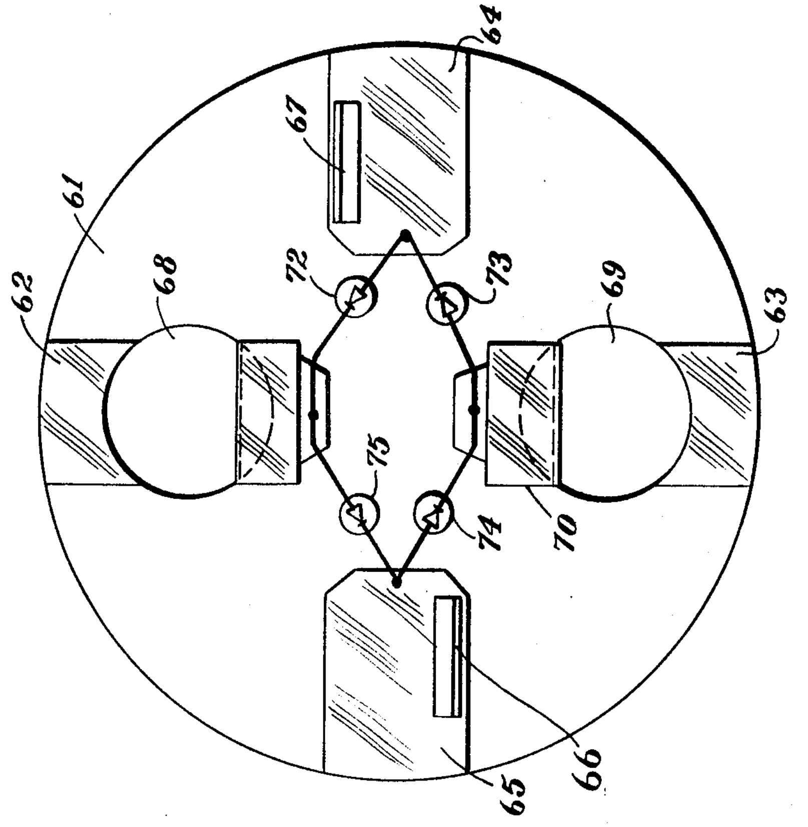
Figure 11:
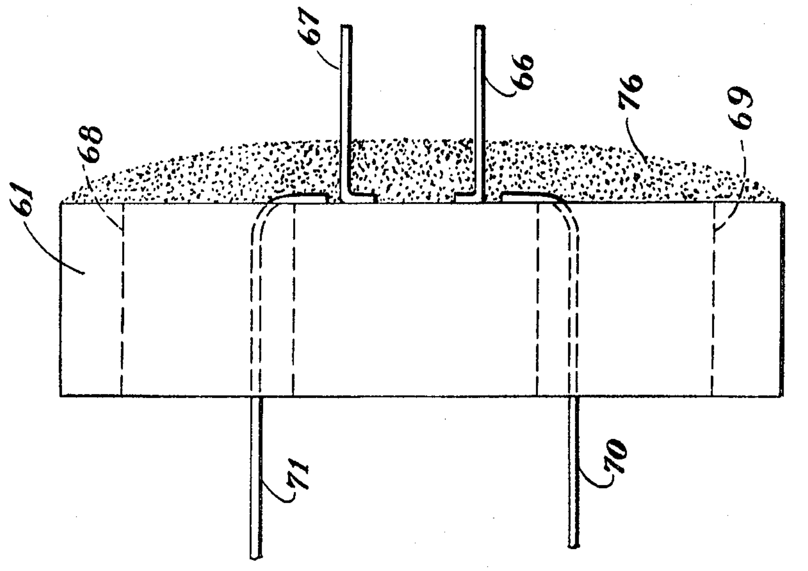

FIG. 4*a* shows a cover for the microwave device of FIG. 4;

FIG. 5 shows the opposite side of the device of FIG. 4;

FIG. 6 shows the details of the diode mounting in the microstrip mixer;

FIG. 7 shows the opposite side of the mounting of FIG. 6;

FIG. 8 shows the suspended microstrip within the devices of FIGS. 4 and 5;

FIG. 9 shows in detail the tapered baluns within the microwave device;

FIGS. 10 and 11 show one embodiment of the diode package;

FIGS. 12 – 15 show a further packaging arrangement of the diodes.

Figure 1A:
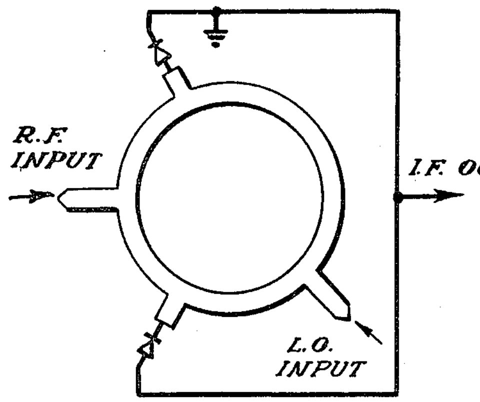
FIG. 1A (PRIOR ART)
Figure 1B:
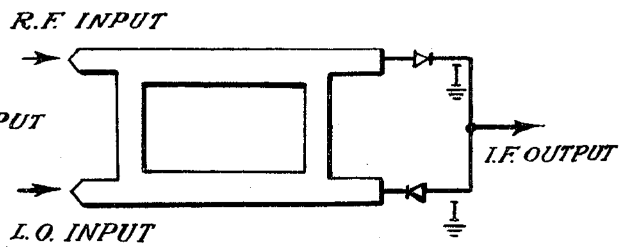
FIG. 1B (PRIOR ART)
Figure 1C:
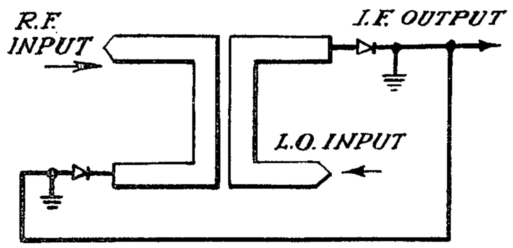
FIG. 1C (PRIOR ART)

Referring to FIG. 1, three types of conventional coupler configurations are shown. All three types are used for balanced mixers. FIG. 1*a* shows the rat race type configuration. The signal fed into the input terminal will divide and two equal components will appear at the output terminals. FIG. 1*b* shows the commonly known branch line coupler. FIG. 1*c* shows the 90° backward wave type, comprised of two parallel coupled transmission lines. These couplers can be made of coaxial cable, waveguide or strip line. However, when microstrip construction is used, although the size and cost are reduced, they provide only limited bandwidths and poor RF to LO isolation.

Figure 2A:
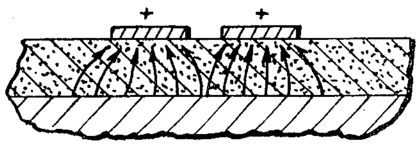
FIG. 2A (PRIOR ART)
Figure 2B:
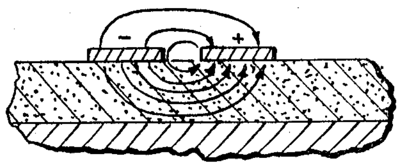
FIG. 2B (PRIOR ART)

FIG. 2 illustrates the cross section of two parallel coupled microstrip lines and the field associated with each mode. In general, the field configuration will depend upon whether current flows in the same direction on both lines, designated as the even mode, or of opposite direction, designated as the odd mode. Because of the non-homogeneous dielectric, more of the electric field is contained in the dielectric in the even mode than in the odd mode. As a consequence, energy will propagate with different velocities in each mode owing to the equivalent difference in dielectric loading, thus preventing the necessary wave cancellation needed for good coupler isolation.

Figure 3:
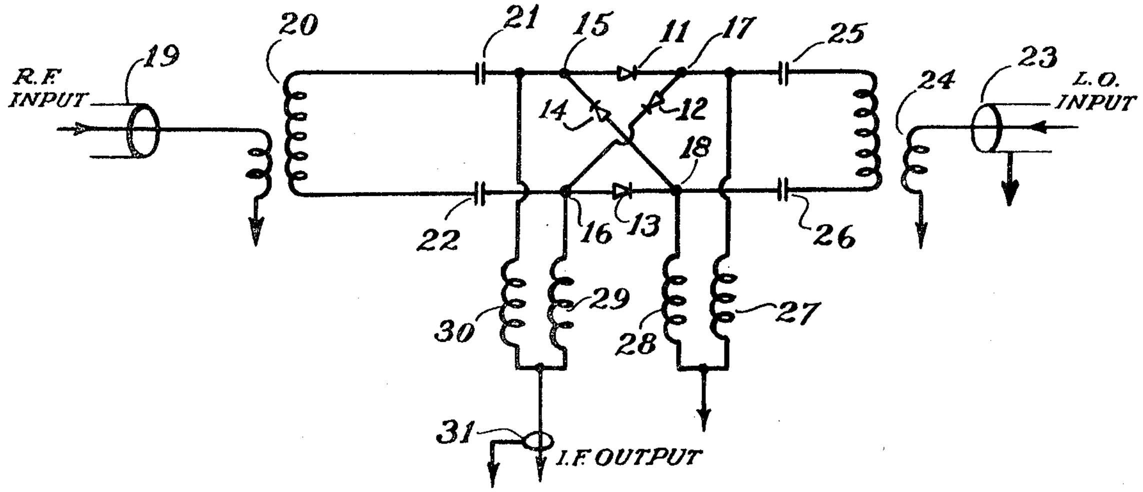
FIG. 3 shows the equivalent circuit of a double balanced mixer as is used in this invention.

In order to provide an improved microstrip mixer, the double balanced mixer configuration of FIG. 3 has been employed in this invention. The mixer comprises 4 diodes 11, 12, 13, 14 in a bridge relationship. The cross terminals of the bridge are 15, 16 and 17, 18. The RF signal input 19 is provided through RF input balun 20 to cross terminals 15, 16. Capacitors 21, 22 on the RF input leads provide decoupling of the IF signal and insures further isolation between the RF and IF signals. The LO input signal 23 is provided across LO input balun 24 to cross terminals 17, 18 of the bridge. Capacitors 25, 26 in the LO signal line provide IF decoupling which isolates the LO and IF signals. The IF output signal developed by the diodes is taken from cross terminals 15, 17 and cross terminals 16, 18 by means of RF chokes 27, 28 and 29, 30. In FIG. 3, IF output 31 is shown taken from RF chokes 29, 30, while chokes 27, 28 are shown grounded. The RF chokes also provide IF coupling by acting as extremely high impedances throughout the microwave range of the mixer, but having a low reactance to the IF frequency.

The double balanced mixer configuration provides inherent isolation between RF and LO signals. This greatly improves the performance of the mixer. Furthermore, the source impedance of the RF and local oscillator inputs can be independently varied to optimize noise figure and LO match. In order to minimize the conversion loss and extend the high frequency response to the mixer, beamlead Shottkey barrier diodes can be used in the bridge circuit.

FIGS. 4 and 5 shows both sides of a microwave mixer using the double balanced diode bridge of FIG. 3. The mixer comprises a housing having a frame 32 inside which seats a dielectric substrate 33. The substrate can be fastened securely to opposite ends of the frame. An RF absorbing material 34 is preferably placed around the circumference of the substrate between the substrate edge and the housing frame. The purpose of the absorbing material will be hereinafter explained. Mixer will work without it except for small regions. Coaxial connectors 35, 36, 37 are fastened externally onto three sides of the housing frame. Connectors 35 and 36 serve as the input terminals and either one can be used for the local oscillator or the RF input signal with the other providing the remaining signal. For this embodiment terminal 35 will be used for the RF signal and terminal 36 for the LO signal. Connector 37 provides the IF output from the mixer.

Placed within a hole 39 in the substrate is the diode bridge 38 of FIG. 3. A first balun 40 is connected between the RF coaxial input 35 and the diode bridge 38. Balun 40 comprises metallic strips 41 and 42 placed on either side of the dielectric substrate 33. A second balun 43 is connected between the LO coaxial input 36 and the diode bridge 38 and comprises metallic strips 44 and 45 on either side of the dielectric substrate. Connected between the IF output connection 37 and the diode bridge 38 are RF chokes 46 and 47. The chokes are wire wound nylon screws and serve to provide IF coupling; for certain frequency ranges the coils could be replaced with straight wire. An IF bypass capacitor 48 is connected to one of the RF chokes 47. A further choke 49 is connected to the diode bridge to provide a DC return for the biasing supplied to the diodes. The end 50 of the coil 49 is grounded onto the housing at 50. Capacitors 51 and 52 are placed between the LO balun 43 and the diode bridge 38 for IF isolation and to couple the LO signal to the bridge.

In order to protect the mixer a cover as shown in FIG. 4*a* can be placed on either side of the mixer. The cover 53 is a plate which has RF absorbing material 55 fastened on to one side. The cover can be fastened onto each side of the mixer by any convenient means including bolting it, soldering it, or any other available techniques. In order to permit access to the internal parts, however, it is advisable to permit removability of the cover from the mixer.

FIGS. 6 and 7 show the detailed connections of the diode bridge to the other circuit components of the microwave mixer. The diode bridge 38 contains four terminals 56, 57, 58, 59. Terminal 56 and 57 represent the cross terminals to which the RF are connected through the balun microstrips 41 and 42. Terminals 58, 59 represent the bridge cross terminals to which the LO input is connected across balun strips 44, 45. Capacitors 51 and 52 for IF isolation and LO coupling are also connected to these last terminals. Although the IF output can be taken from either set of cross terminals, this embodiment shows the IF output taken from cross terminals 58, 59 through the coils 46, 47. If the IF output would be taken from terminals 56, 57, the capacitors 51, 52 would be placed on the balun lines 41, 42 to isolate the IF from the RF signals. The DC return coil 49 is connected between terminal 57 and ground 50.

In order for the baluns to function properly in close proximity to the ground planes, it is important to contain all the RF field energy between the conductors of the balanced and the unbalanced line. This condition is most easily satisfied if the dielectric constant of the medium between the conductors is much higher than that leading to the surrounding metal enclosure. In order to satisfy this condition, a substrate should be used which has a high dielectric constant, and the microstrip should be suspended in air, which has a low dielectric constant. FIG. 8 shows the suspended arrangement of the microstrip baluns of FIGS. 4 and 5. This upper metallic strip 42 and the lower strip 43 are placed on either side of the dielectric substrate. The substrate is preferably of alumina whose dielectric constant is about 9. The substrate is mounted on the frame 33 within a shelf arrangement 65 placed on opposite sides of the frame. The substrate is securely fastened to the shelf by any known technique. The shelf is located on the frame such that the substrate, when in place will be suspended within air whose dielectric constant is about 1. Because of the large difference in dielectric constants between the medium between the conductors and the medium surrounding the conductors, almost all of the RF field energy will be contained between the conductors in the dielectric material. The field lines are shown at 61. To further retain the RF field energy, RF absorbing material 34 is placed between the edges of the substrate and the frame as hereinbefore described.

The bandwidth of the double balanced mixer is mainly limited by the microstrip baluns. In order to extend the bandwidth, the baluns were designed to be frequency independent. This was accomplished by tapering the conventional ground side, which is left ungrounded, of the balun to follow a specified impedance variation between the unbalanced coaxial line and the balanced bridge arrangement. FIG. 9 represents a simple schematic of the microwave mixer of FIGS. 4 and 5, to clearly bring out the tapering of the microstrip. The substrate 33 is within the housing 32 to which are connected terminals 35, 36. The diode bridge 38 is in the substrate. Connected between the terminal 35 and the bridge 38 balun 40 comprises metallic strip 41, 42 wherein the one plane side of the balun has the strip 42 tapered from the connector end to the diodes. Similarly, balun 43 between the connector 36 and the bridge 38 has its one side strip 45 (shown by dotted line) tapered. Although the tapering may typically follow a Chebyshev variation, any other variation can also be used depending on the characteristic impedances desired. The baluns could also be constructed by using a constant width strip on one side and shaping the other normally smaller strip outward until it equals the width of the strip on the first side. In addition, for certain frequency ranges it is possible to achieve mixer action without tapering the input baluns. Best results were achieved with the strips made of gold.

During the course of testing the tapered microstrip baluns, it was found that at those frequencies where the length of the section is one-half a wavelength, a reflection occurred the magnitude of which depends on the even mode impedance of the strip to ground and the corresponding loss of this mode. By judicious placement of lossy material on the case of the mixer, it is possible to reduce the effect of these resonances significantly without raising the loss of the odd mode or desired balanced impedance.

FIGS. 10 and 11 described one embodiment of the diode bridge assembly. Upon the substrate 61 are placed four strips of metallized material 62, 63, 64, 65. These metallized strips serve as the terminal contacts for the diode chips. Attached to terminals 64 and 65 are gold plated leads 66, 67, each welded to an opposite side of the metallized terminal and bent upward at right angles to the surface. A hole 68, 69 is drilled through each metallized area 62, 63 and on through the substrate edge. Gold plated leads 70, 71 are welded to the metallized surfaces 62, 63 and bent at right angles to the surface in a downward direction passing through the holes 68, 69 and extending beyond the dielectric material through the opposite surface. The diode chips 72, 73, 74, 75 are each connected between two different adjacent metallized terminals to form a bridge arrangement. The entire surface of the substrate is covered with an epoxy coating 76 to protect the diodes from handling damage and from changing atmospheric conditions. Matched Schottky diodes as are known in the art are used for this assembly. The entire dielectric surface 61 as shown can be made as small as 0.1 in diameter, and 0.035 inches in thickness.

Figure 12:
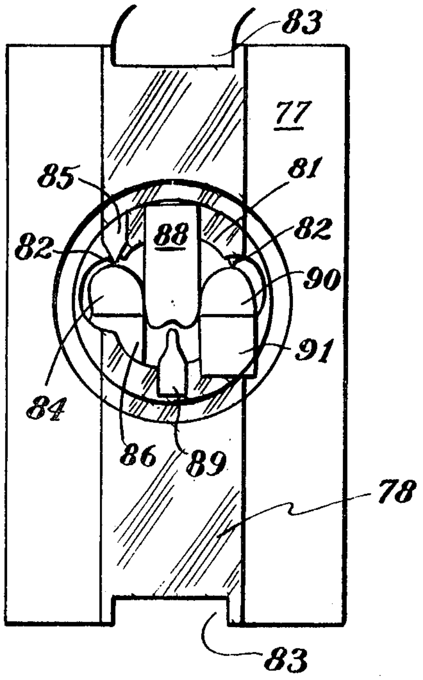
Figure 13:
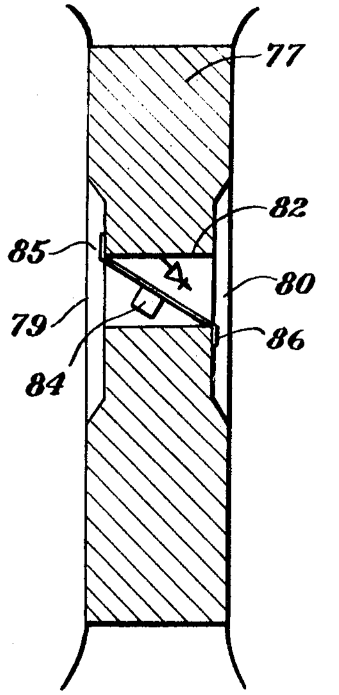
Figure 14:
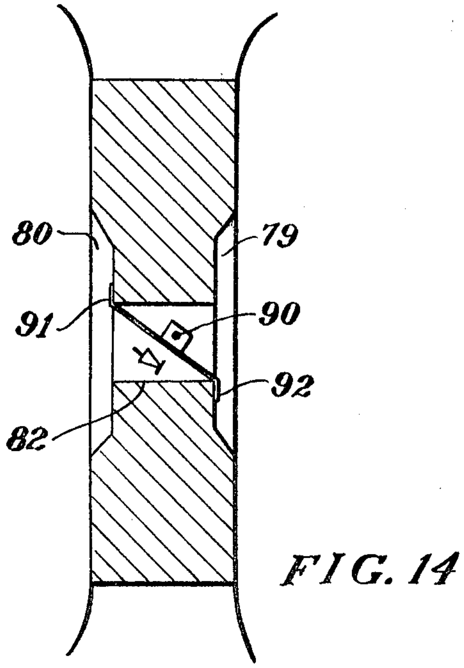

A further embodiment of the diode bridge arrangement is shown in FIGS. 12–15. FIG. 12 shows a substrate 77 upon which is placed a metallized area 78 on both surfaces, consisting of a layer of gold over a layer of chromium. The upper and lower surface of the substrate has a countersunk circle 79, 80 to protect all welded parts from handling damage. A hole 81 within the countersunk portion is drilled through the entire metal surface and substrate. Two smaller holes 82 are also drilled through the entire metallized surface and substrate. The two smaller holes intersect the larger hole 81 on either side. The leads from the microstrip 83 are connected at either end of the metallized surface. A first diode 84 is placed in one of the smaller holes 82 and is connected to the upper metallized surface by means of lead 85 and to the lower end by means of lead 86. The placement of diode 84 can best be seen from the section A view of the assembly shown in FIG. 13.

Figure 15:
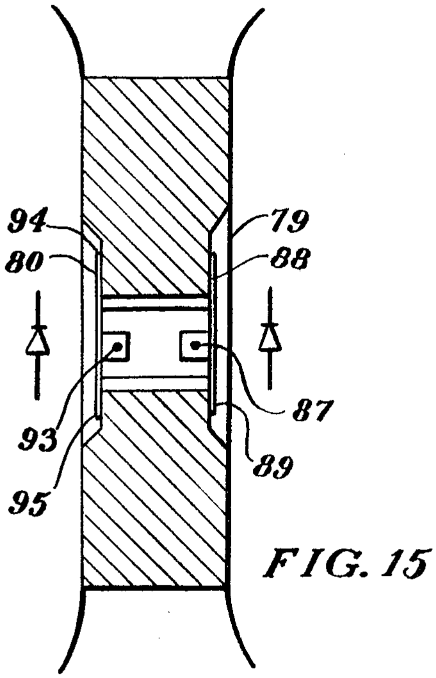

A second diode 87 is placed in the larger hole 82 near the upper surface of the substrate. It is connected to the two parts of the upper metallized surface by means of leads 88, 89. (Sections B—B (FIG. 15). A third diode 90 is placed on the second small hole 82 and connected between the upper and lower surfaces by means of leads 91, 92 (Section C—C, FIG. 14). The fourth diode 93 is placed in the large hole near the lower surface of the substrate and is connected to the two lower sections of the metallized surfaces by means of leads 94, 95. The four diodes, by the above mentioned electrical connections, form a diode bridge arrangement.

The diodes used were matched beamlead Shottkey barrier diodes designed to provide a reflectionless extension of the microstrip lines on the alumina substrate. By having holes of different sizes, a larger hole for the horizontally connected diodes and a smaller hole for the diagonally connected diodes, it is possible to equalize the lead length of each diode to its respective connection point and thereby insure high electrical isolation of RF and LO ports. The diode package can be replaced in the field, if silver epoxy is used to make contact with the beamleads of the package. However, for maximum reliability, a factory welded replacement package is superior.

Using this embodiment the entire package can be made as small as 0.1 in. in length.

What has been described in a microwave embodiment of a double balanced diode bridge assembly using microstrip baluns whose one plane side is tapered according to a given impedance variation. This device can also be used as a voltage controlled attenuator over the same frequency range as the mixer, by simply applying a variable DC voltage to the IF terminal, and using the RF and LO ports as the input and output of the attenuator. These and other arrangements and uses can readily be devised in accordance with the principles taught above, by those skilled in the art without departing from the spirit and scope of the invention.

What I claim as new and desire to secure by Letter Patent is:

1. A double balanced microwave mixer comprising a diode bridge having four substantially matched diodes; first means for directly supplying an RF signal input; second means for directly supplying a local oscillator input third means for directly taking an output, and first and second balanced microstrip baluns whose substrate has a higher dielectric constant than the dielectric constant surrounding the baluns and whose metallic strip on one side plane of each of said baluns is tapered as a function of distance from said first and second means to said diode bridge, said baluns placed respectively between said first and second means and said bridge.

2. A mixer as in claim 1 further including a frame, the dielectric substrate supported by said frame, said diode bridge placed within said substrate and said balanced microstrip baluns formed by placing metallic strips of the desired impedance on either side of said dielectric substrate.

3. A mixer as in claim 1 wherein said first, second and third means includes connecting means to unbalanced transmission lines.

4. A device as in claim 3 wherein the tapering of the metallic strips is such that the impedance transformation from the unbalanced lines to the balanced bridge follows a Chebyshev distribution so as to produce a minimum mismatch in the transition from the unbalanced to the balanced conditions.

5. A device as in claim 2 wherein said substrate is suspended within air and is in direct contact with said frame only at the points of support, and wherein said substrate consists of an alumina dielectric.

6. A device as in claim 2 and further comprising inductance coils placed between said third means and said bridge and decoupling means associated with said first and second means for providing a high impedance at the output frequency.

7. A device as in claim 5 further including RF lossy material placed around the edge of said substrate between said substrate and said frame.

8. A device as in claim 1 wherein said diodes are beamlead Shottkey diodes.

9. A double balanced microwave mixer having substantial frequency independent balun for the transmission of microwave electrical energy formed of a balanced microstrip comprising a dielectric material, a first metallic strip placed on one side thereof and whose width provides the desired characteristic impedance, and a second metallic strip placed on the other side of said dielectric material, wherein said second metallic strip is tapered as a function of distance from the start of the balun until it equals the width of said first metallic strip.

10. A device as in claim 8 wherein one end of said balun is connected to an unbalanced transmission line; the other end is connected to a balanced line and said tapering is such that the impedance transformation from said unbalanced to said balanced lines follows a predetermined distribution so as to produce minimum mismatch in the transition from the unbalanced to the balanced conditions.

11. A device as in claim 10 wherein said balanced lines contain a double balanced diode bridge arrangement, supplied with a signal input, a local oscillator input and producing an output, and wherein a balun is placed between each of said inputs and said bridge.

12. A double balanced microwave device comprising four substantially matched diodes forming a bridge arrangement of four arms and first and second pairs of diagonally opposing terminals therebetween; a first means directly supplying a first input signal; a second means directly supplying a second input signal; a third means for directly taking an output signal; a dielectric substrate whose dielectric constant is higher than the surrounding dielectric constant, said bridge placed within said substrate wherein said terminals are externally available for contact therewith; a first balanced microstrip balun connected between said first means and a first pair of diagonally opposing terminals; a second balanced microstrip balun connected between said second means and a second pair of diagonally opposing terminals; said first and second balanced microstrip baluns having one of their sides tapered, and inductance coils connected between said third means and either of said diagonally opposing terminals.

13. A device as in claim 12 for use as a mixer wherein said first input signal is an RF signal, said second input signal is a local oscillator signal and said output signal is the IF signal produced by the mixer.

14. A device as in claim 12 further comprising a frame, and wherein said first, second and third means include coaxial cable connectors placed on said frame, and said dielectric substrate is supported within said frame and substantially surrounded by air.

15. A device as in claim 12 for use as a microwave mixer wherein when the third signal is of a frequency lower than that of the first input signal the frequency of the second signal is the difference between the first signal and that of the third signal.

16. In a double balanced microwave mixer supplied with an input signal, a local oscillator signal and producing an output signal comprising four substantially matched diodes and balanced microstrip baluns connected between said inputs and said diodes, the diode assembly consisting of a dielectric substrate, four separate metallized areas placed on one surface thereof, first two conducting leads, each connected to one of two of said metallized areas and extending transverse to said surface, a hole placed in each of the remaining two metallized areas and extending through the dielectric thereunder, second two conducting leads, each connected to a one of said remaining two metallized areas, passing through said holes and extending transverse to said surface opposite to said first two leads, said four diodes connected to said metallized areas in an electrical bridge arrangement, and said microstrip baluns connected to said leads.

17. A device as in claim 16 wherein said diodes are placed upon said substrate, and said diodes and substrate are covered with an epoxy coating.

18. In a double balanced microwave mixer supplied with an input signal, a local oscillator signal and producing an output signal, comprising four substantially matched diodes and balanced microstrip baluns connected between said inputs and said diodes, the diode assembly consisting of: a dielectric substrate, a metallized area placed on both upper and lower surfaces thereof, a first hole extending through said metallized areas and dielectric, two equal smaller holes placed through said metallized areas and dielectric, said smaller holes being symmetrically placed on either side of said first hole and partially intersecting it, said holes in combination producing a discontinuity in both metallized areas, thereby forming a first and second part thereof, a first diode placed in said small hole having one end thereof connected to a first part of the upper surface of said metallized area and a second end thereof connected to a second part of the lower surface of said metallized area, a second diode placed in said first hole having one end thereof connected to the a first part of the upper surface of said metallized area and a second end thereof connected to a second part of the upper surface of said metallized area, a third diode placed in the other of said small holes and having one end thereof connected to a first part of the lower surface of said metallized area and a second end thereof connected to a second part of the upper surface of said metallized area, a fourth diode placed in said first hole and having a first end thereof connected to a first part of the lower surface of said metallized area and a second end thereof connected to a second part of the lower surface of the metallized area, whereby the lengths of all said connections will be substantially identical, and said microstrip baluns are connected to the metallized areas.

19. The apparatus of claim 18 wherein said portions of said frame contacting said substrate also contact the metallic strip on the face of the substrate contacted by the frame.

* * * * *